United States Patent [19]

Kim

[11] Patent Number: 5,440,429
[45] Date of Patent: Aug. 8, 1995

[54] PROJECTION LENS SYSTEM FOR REAR TYPE PROJECTION TELEVISION

[75] Inventor: Dong-ha Kim, Suwon, Rep. of Korea
[73] Assignee: Samsung Electronics Co., Ltd., Kyunggi, Rep. of Korea
[21] Appl. No.: 141,945
[22] Filed: Oct. 28, 1993
[30] Foreign Application Priority Data Oct. 28, 1992 [KR] Rep. of Korea ............... 92-19860

[51] Int. Cl.$^6$ ............................. G02B 3/02
[52] U.S. Cl. ................... 359/649; 359/650; 359/714; 359/715
[58] Field of Search ............... 359/649–650, 359/708, 713–715, 754–757, 759, 761, 763–764, 767, 770–772, 780–782

[56] References Cited

U.S. PATENT DOCUMENTS 4,776,681 10/1988 Moskovich .................. 359/771
5,212,597 5/1993 Yamada ..................... 359/649

Primary Examiner—Loha Ben
Assistant Examiner—James Phan
Attorney, Agent, or Firm—Sughrue, Mion, Zinn, Macpeak & Seas

[57] ABSTRACT

The present invention relates to a projection lens system for use in a rear type projection television. The projection lens system includes a plurality of lenses which are sequentially arranged along an optical axis perpendicular to a CRT screen. The system includes: a first lens unit including at least one lens of meniscus form and having a weak positive or weak negative optical power; a second lens unit including one lens with a strong positive optical power and a bi-convex form; a third lens unit including at least one lens having a weak positive or negative optical power, and a further lens having a strong positive optical power; a fourth lens unit having a strong negative optical power and including a meniscus lens that is convex toward the CRT screen and that has a strong negative optical power, the fourth lens unit further including a coolant for cooling a fluorescent surface of the CRT. The optical power of the whole system is largely divided between the second and third lens units. The projection lens system according to the present invention can maintain brighter images, a wider field-angle and a high relative illumination ratio. It can also prevent the change in shape of lenses by accommodating a relatively stable frame for emitting heat, and can preserve good image formation capability and easily adjust aberrations.

20 Claims, 6 Drawing Sheets

PROJECTION LENS SYSTEM FOR REAR TYPE PROJECTION TELEVISION

BACKGROUND OF THE INVENTION

The present invention relates to a projection lens system for use in a rear type projection television, and more particularly to a projection lens system for enhancing image formation capability and relative illumination ratio over known systems.

A projection television enlarges and projects lights of red (R), green (G) and blue (B) emitted from a cathode-ray tube (CRT) onto a CRT screen through the use of a plurality of projection lenses. Generally, projection methods are classified into the following: a front type projection method in which images are projected onto the front surface of a CRT screen such that the images reflected from the CRT screen can be viewed by a user, and a rear type projection method in which images are projected onto the rear surface of the CRT screen such that the images transmitted through the CRT screen can be viewed by the user.

In rear type projection televisions which use the rear type projection method, since the lights entering the screen are not reflected from the screen but transmitted through it, definitive images can be provided even in the bright peripheral areas of the screen. Accordingly, rear type projection televisions are generally preferred by users.

However, such projection televisions require high aperture ratios so as to obtain brighter images, by concentrating the maximum luminous flux emitted from the CRT onto the screen. The projection television also needs a wide field-angle in order to enlarge projection magnification, while at the same time minimizing the depth of the projection system. Also, such projection televisions require a frame for emitting heat. Heat emitted from the fluorescent surface of the CRT can deform the lenses, which, in turn, lowers image formation capabilities. Further, brightness differences between the center of the screen and the periphery thereof should be kept to a minimum.

To meet the above requirements, several projection lens systems have been developed. However, in conventional projection lens systems, an optical power of a single glass lens provides most of the optical power in the projection lens system, whereby relatively bright images are obtained. But, since a relative illumination ratio (that is, a brightness ratio of a peripheral portion with respect to a screen center portion) is low, the periphery of the screen is relatively dark as a result. In order to raise the relative illumination ratio, in the past, the field-angle has been reduced, which gave rise to further disadvantages. Also, when lenses of short focal length are arranged with a mini-CRT screen having a small fluorescent surface, image formation capability is reduced, thereby lowering the relative illumination ratio.

Moreover, since the optical power of the whole system has been designed to be concentrated on one power lens, it has been difficult to adjust spherical aberration, distortion aberration, oblique astigmatism and coma aberration.

SUMMARY OF THE INVENTION

Therefore, to solve the above problems, it is an object of the present invention to provide a projection lens system for a rear type projection television which maintains brighter images, a wider field-angle and a high relative illumination ratio by bisecting the optical power of the whole projection lens system between two predetermined lens units. It is a further object to provide a projection lens system that has a stable frame for emitting heat, and preserves a good image formation capability and a high relative illumination ratio for a lens with short focal length.

To accomplish the above objects of the present invention, there is provided a projection lens system including a plurality of lenses which are sequentially arranged along an optical axis perpendicular to a CRT screen for use in a rear type projection television. The projection lens system comprises: a first lens unit including at least one lens having a meniscus form and a weak positive or weak negative optical power; a second lens unit including one lens with a strong positive optical power and a bi-convex form; a third lens unit including at least one lens having a weak positive or negative optical power and another lens having a strong positive optical power; and a fourth lens unit including a meniscus lens that is convex toward the CRT screen and that has a strong negative optical power, the fourth lens unit also including a coolant for cooling a fluorescent surface of the CRT and having a strong negative optical power.

DETAILED DESCRIPTION OF THE PREFERRED EMBODIMENTS

Preferred embodiments of the present invention will be described below in more detail with reference to the accompanying drawings.

Figure 1:
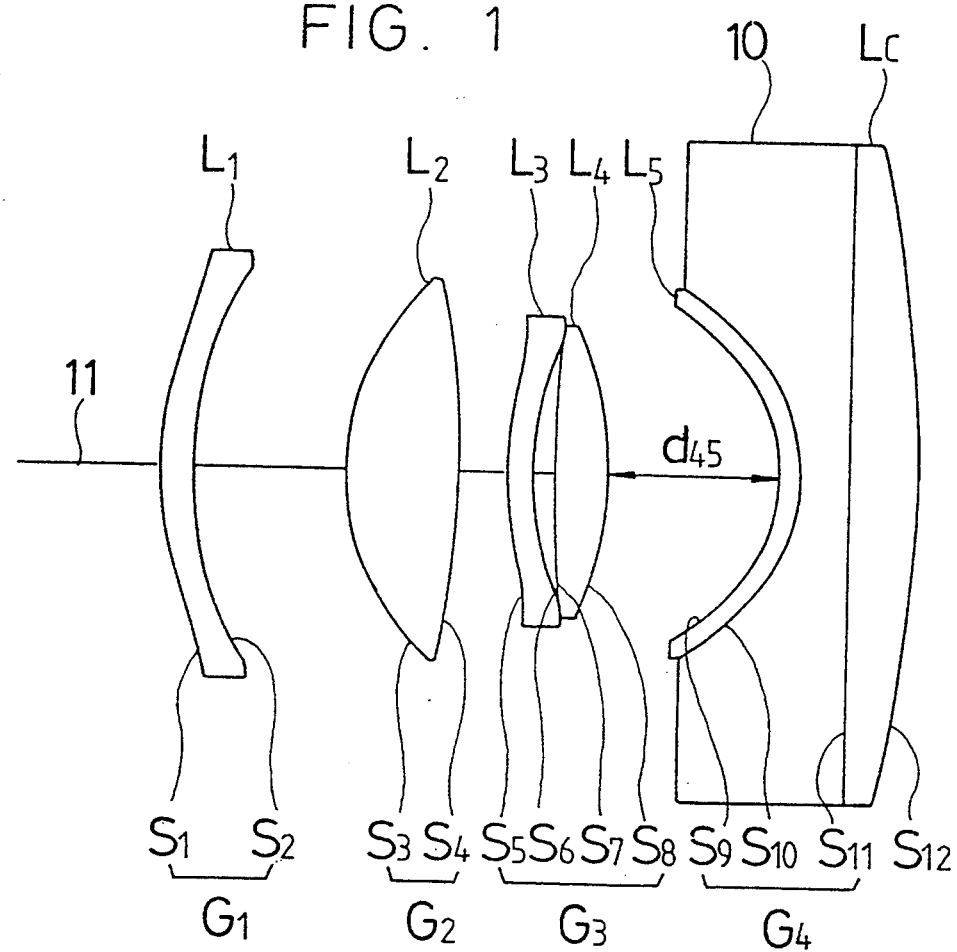
FIG. 1 is a lens arrangement diagram of a first embodiment of a projection lens system according to the present invention.
Figure 2:
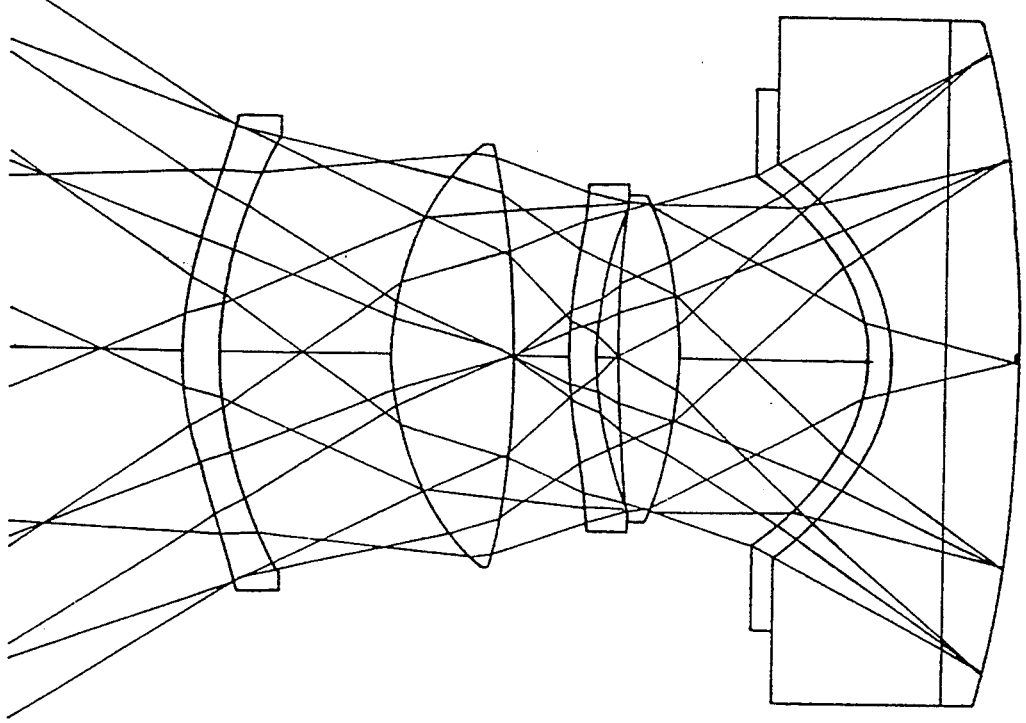
FIG. 2 shows an example of light paths for the projection lens system of FIG. 1.
Figure 5:
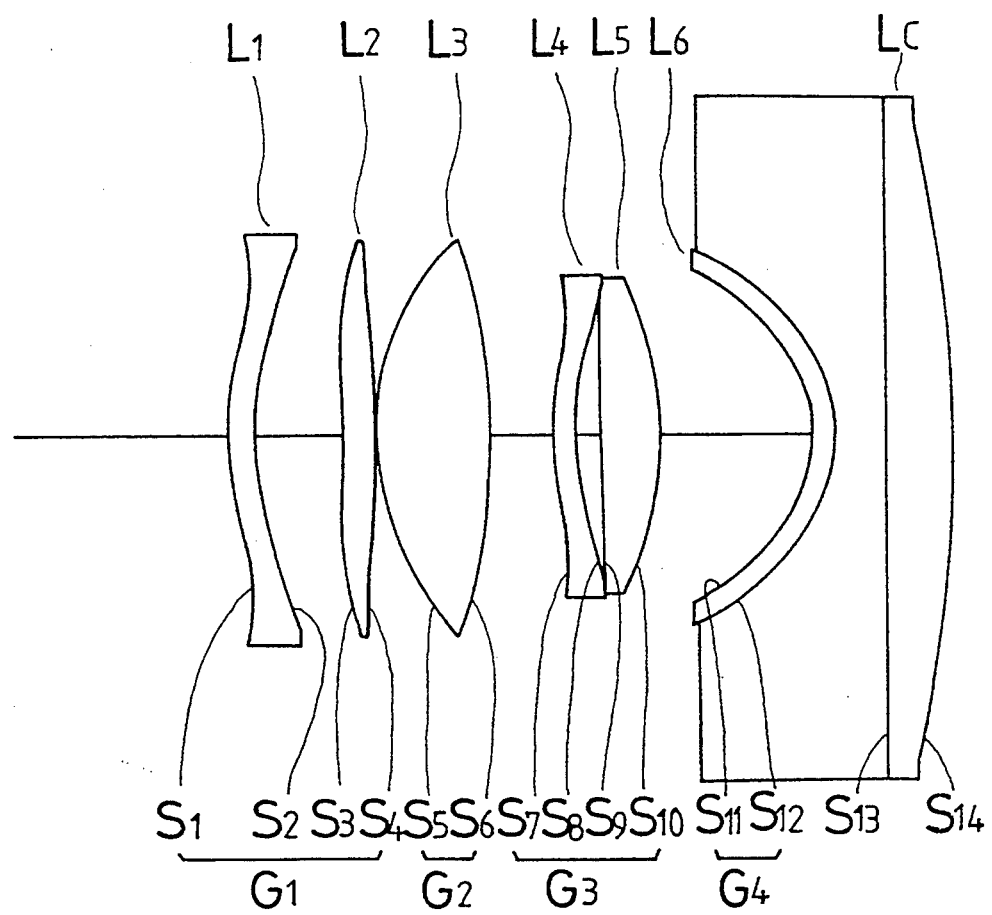
FIG. 5 is a lens arrangement diagram of a fourth embodiment of the projection lens system according to the present invention.

FIG. 1 is a lens arrangement diagram of one embodiment of a projection lens system according to the present invention. FIG. 2 shows an example of light paths for the projection lens system. As shown, the projection lens system according to the present invention comprises first to fifth lenses $L_1$, $L_2$, $L_3$, $L_4$ and $L_5$, which are, in turn, arranged along an optical axis 11 from a reflective mirror (not shown) to a front glass Lc of a CRT screen. Tables 1A and 1B show specifications for the projection lens system of FIG. 1. Such a projection lens system includes a cooling means 10, filled with a coolant, between the font glass Lc of the CRT screen and the fifth lens $L_5$. The cooling means 10 prevents or minimizes changes in shape of the lens $L_5$ due to heat emitted from the CRT. A first lens unit $G_1$ includes at least one lens having a meniscus form and a weak positive or negative optical power. In the embodiment of FIG. 1, the first lens unit $G_1$ includes one lens $L_1$ of a meniscus form, which has a positive optical power in its optical axis area and a negative optical power in its peripheral area. Preferably, the lens $L_1$ has at least one aspherical surface. Such a first lens unit $G_1$ plays a role in correcting spherical aberration, coma aberration and oblique aberration. As shown in FIG. 5, alternatively, the first lens unit $G_1$ can include a first lens $L_1$ having a negative optical power and a second lens $L_2$ having a positive optical power. A second lens unit $G_2$ includes one lens $L_2$ with a strong positive optical power and a bi-convex form. The second lens unit $G_2$ is one of the lens units providing most of the optical power in the projection lens system. A third lens unit $G_3$ has a meniscus form and includes plural lenses such that one of the lenses has a weak positive or negative optical power, and another lens has a strong positive optical power. The unit corrects coma aberration, oblique aberration and distortion aberration. In the embodiment of FIG. 1, the third lens unit $G_3$ is composed of the third lens $L_3$ and fourth lens $L_4$. A peripheral portion of third lens $L_3$ has a weak positive optical power, in which at least one surface is aspherical. In such a projection system, the optical power ratio of the third lens $L_3$ relative to the whole system meets the following condition (1).

$$|K_{L3}/K_0| < 0.18 \tag{1}$$

Here, $K_{L3}$ represents an optical power of the third lens, and
$K_0$ represents the optical power of the whole lens system.

The fourth lens $L_4$ is either bi-convex or is convex only toward the CRT screen, has a strong positive optical power, and supplies roughly half the optical power of projection lens system, together with the above second lens $L_2$ supplying roughly the remainder. The resulting optical power ratios should meet the following conditions (2) and (3).

$$0.45 < K_3/K_2 < 1.35 \tag{2}$$

$$0.55 < K_{L4}/K_2 < 1.35 \tag{3}$$

Here $K_2$ represents an optical power of the second lens unit, $K_3$ represents an optical power of the third lens unit and, $K_{L4}$ represents an optical power of the fourth lens.

A fourth lens unit $G_4$ includes a fifth lens $L_5$ with a meniscus form and a cooling means 10. Further, the fourth lens unit $G_4$ has a strong negative optical power. The lens $L_5$ has a strong negative optical power, and corrects curvature of field and distortion aberration. The fifth lens $L_5$ is a meniscus lens, convex toward the CRT screen. At least one of its surfaces is aspherical. Also, the refractive index of the coolant used in the cooling means 10 is almost equal to that of the fifth lens $L_5$.

The projection lens system of FIG. 1 is designed according to the data set forth in Tables 1A and 1B.

The term "thickness" in Table 1 represents a distance between a refractive surface and another refractive surface of each lens along the optical axis, "$N_d$" signifies refractive index, and "$V_d$" is a dispersion value known as Abbe-number, respectively.

Further, a surface sag value Z necessary for designing an aspherical lens is determined by the following equation (4).

$$Z = \frac{H^2/R}{1 + \sqrt{1 - (K + 1)H^2/R^2}} + AH^4 + BH^6 + CH^8 + DH^{10} \tag{4}$$

In equation (4), the reference symbol "K" is a conic constant of each aspherical surface, the reference symbol "R" is a radius of each surface, the reference symbol "H" is a semi-aperture distance which is a random radius distance location from the optical axis, and reference symbols "A" to "D" are aspherical coefficients. The radius of each surface is shown in Table 1A, and the conic constant K and aspherical coefficients A-D are represented in Table 1B. Table 1C shows the performance characteristics of the projection lens system designed with specifications according to Tables 1A and 1B, which characteristics are indicative of sufficient brightness on the screen and sufficient field-angle.

The projection lens system described maintains image formation capability around the screen due to an increase in the quantity of peripheral light at a constant field-angle, thereby generally providing a good contrast in quality and resolution to the screen. Also, unlike conventional projection lens systems, since the second lens $L_2$ and fourth lens $L_4$ roughly split the optical power in the whole system between them, it is easy to correct spherical aberration, coma aberration, oblique aberration, distortion aberration and curvature of field. Besides, since the second lens $L_2$ and fourth lens $L_4$ are made of glass having a relatively low dispersion value (e.g., an Abbe number below 50.0), the variation in the Petzval aberration sum according to red, green and blue light wavelengths of the respective CRTs is minimized. Since the second lens $L_2$ and fourth lens $L_4$, which share, largely, the whole optical power, are made of glass, not plastic, changes in the shape of the lenses due to heat emitted from the CRT is prevented.

The projection lens system in accordance with the present invention is able to adjust the distance $d_{45}$ between the fourth lens $L_4$ and fifth lens $L_5$, in order to adjust the focal length, corresponding to the variation of projective distance, according to the magnification of each lens. This makes possible the effective correction of variations in focal length according to red, green and blue light wavelengths of the respective CRTs.

Figure 3:
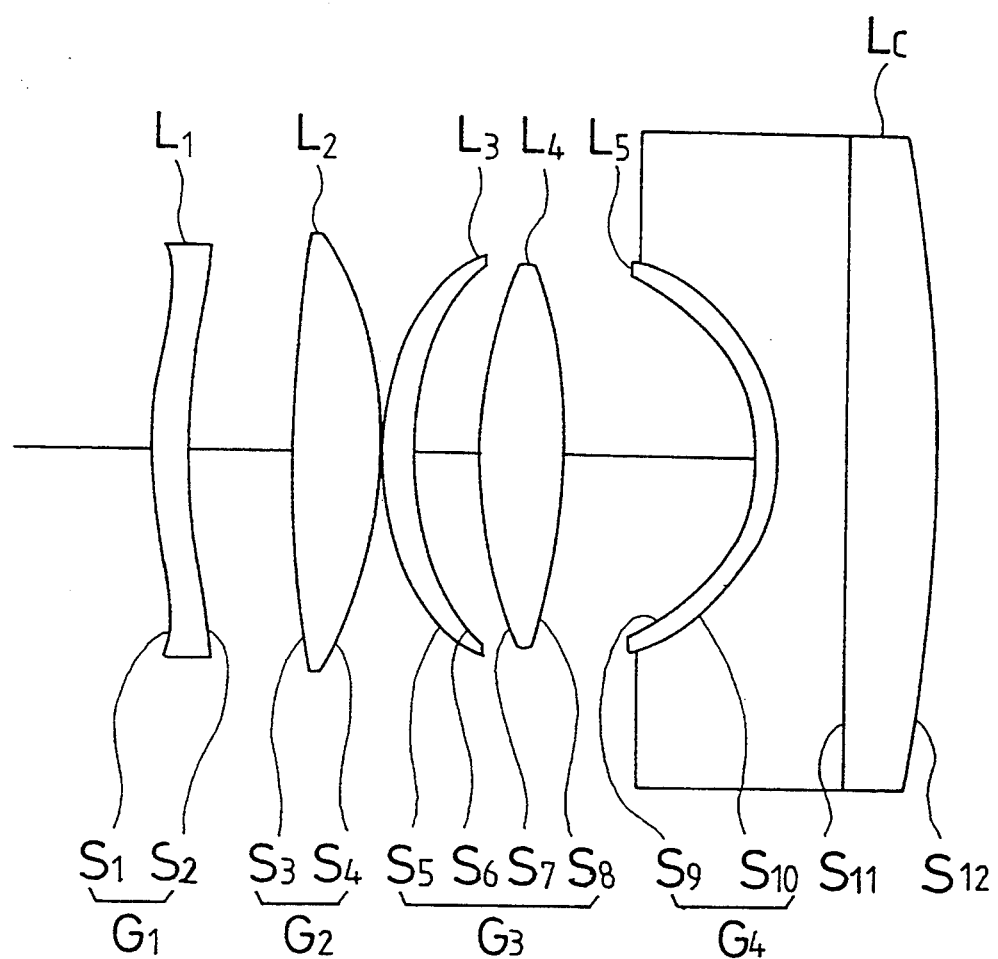
FIG. 3 is a lens arrangement diagram of a second embodiment of a projection lens system according to the present invention.

FIG. 3 is a lens arrangement diagram of a second embodiment of the projection lens system according to the present invention. Tables 2A and 2B show specifications of the projection lens system of FIG. 3, and Table 2C represents the performance.

Figure 4:
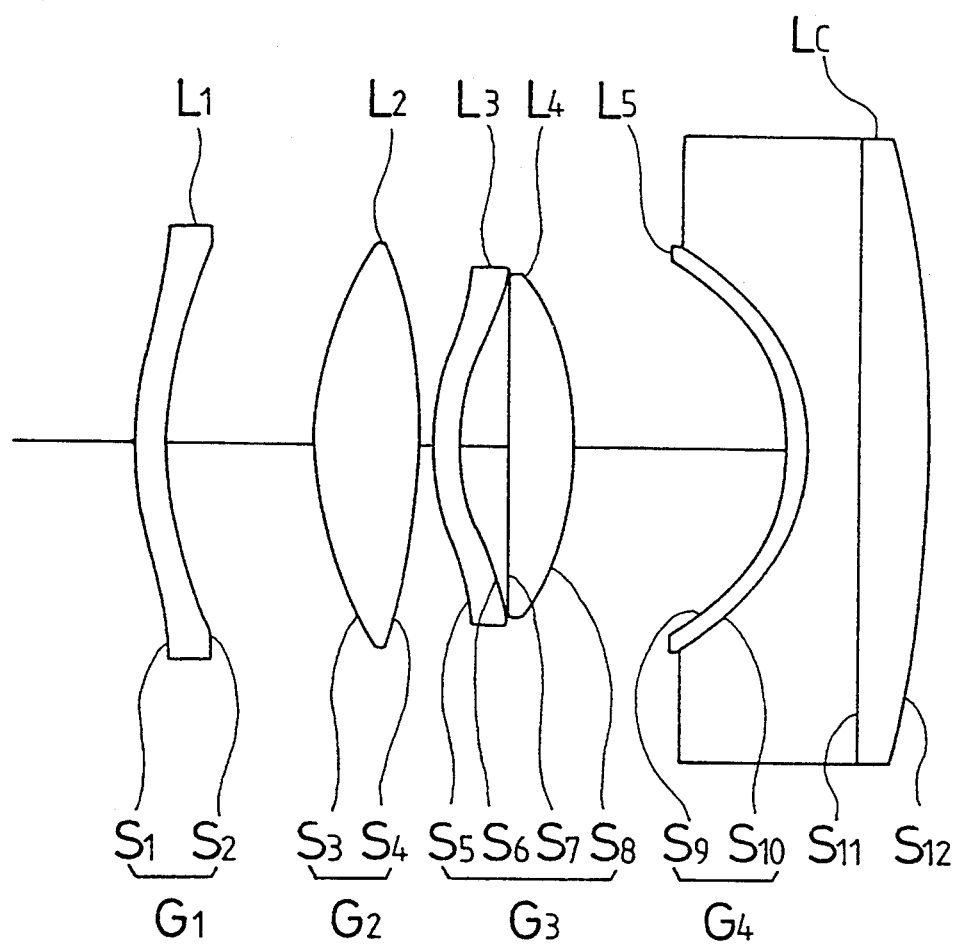
FIG. 4 is a lens arrangement diagram of a third embodiment of the projection lens system according to the present invention.

FIG. 4 is a lens arrangement diagram of a third embodiment of the projection lens system according to the present invention. Tables 3A and 3B show specifications for the projection lens system in FIG. 4, and Table 3C represents the performance.

FIG. 5 is a lens arrangement diagram of a fourth embodiment of the projection lens system according to the present invention. Tables 4A and 4B show specifications of the projection lens system of FIG. 5, while Table 4C represents the performance.

Figure 6:
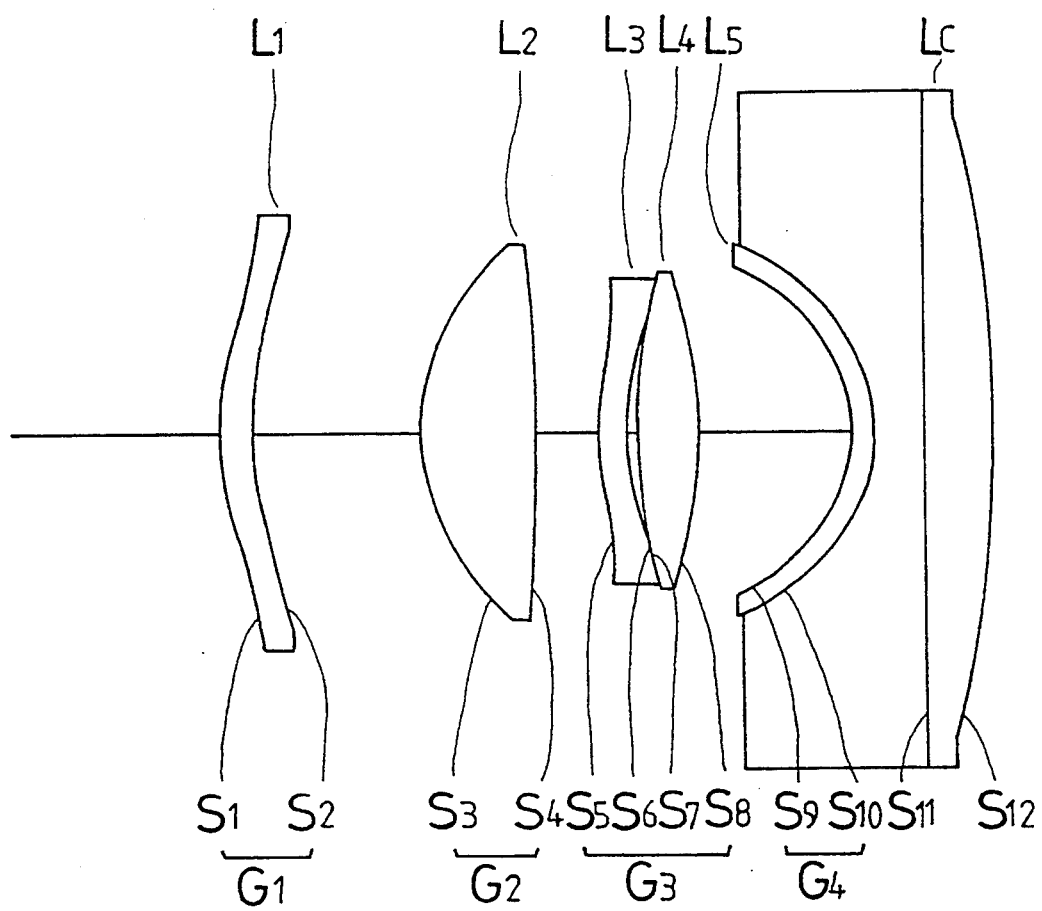
FIG. 6 is a lens arrangement diagram of a fifth embodiment of the projection lens system according to the present invention.

FIG. 6 is a lens arrangement diagram of a fifth embodiment of the projection lens system according to the present invention. Tables 5A and 5B show specifications of the projection lens system of FIG. 6, and Table 5C represents the performance.

Figure 7:
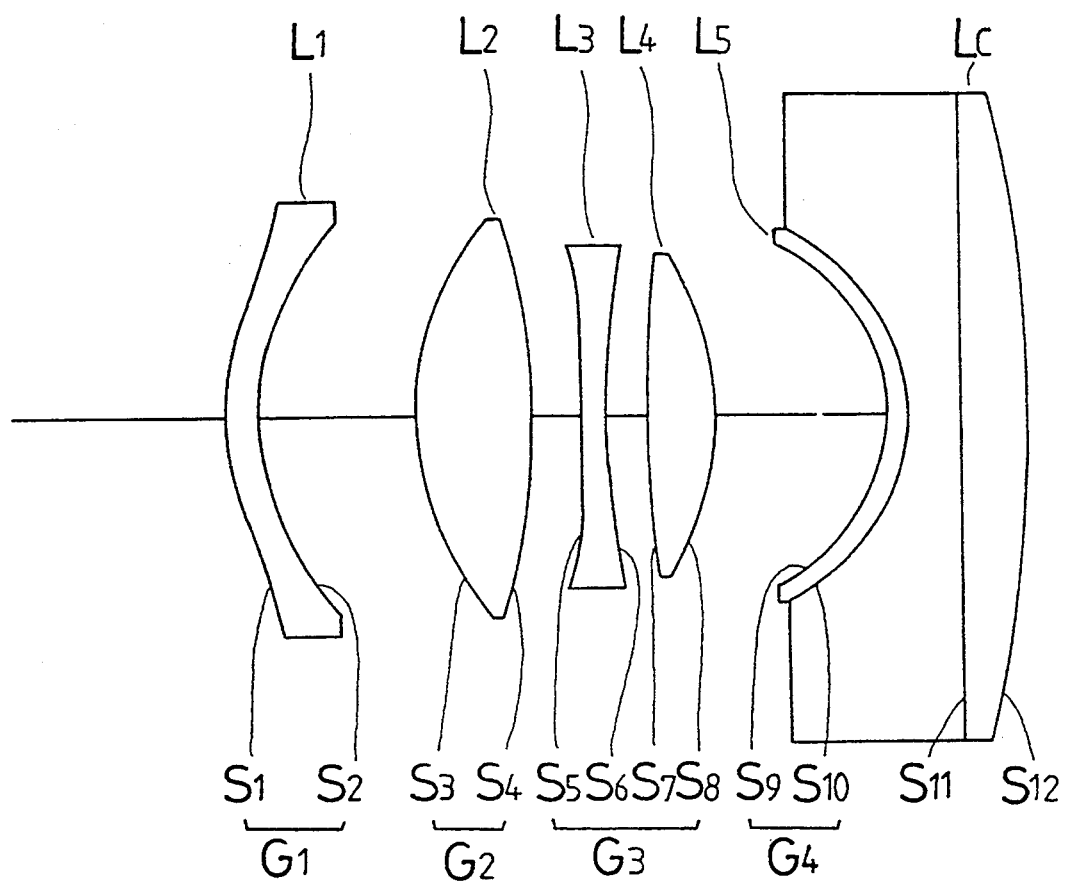
FIG. 7 is a lens arrangement diagram of a sixth embodiment of the projection lens system according to the present invention.

FIG. 7 is a lens arrangement diagram of a sixth embodiment of the projection lens system according to the present invention. Tables 6A and 6B show specifications of the projection lens system of FIG. 7, while Table 6C represents the performance.

The image formation principles for the projection lens systems illustrated in the second to sixth embodiments are analogous to those of the projection lens system of FIG. 1. Accordingly, further explanation is omitted.

As described above, the projection lens system for a rear type projection television according to the present invention can maintain brighter images, a wider field-angle and a high relative illumination ratio. Further, it can accommodate a relatively stable frame for emitting heat, while exhibiting good image formation capability and a high relative illumination ratio for a lens with a short focal length.

TABLE 1A

| LENS | SURFACE | RADIUS | THICKNESS | $N_d$ | $V_d$ |
|---|---|---|---|---|---|
| L1 | S1 | 76.1376 | 6.1700 | 1.492 | 57.1 |
|  | S2 | 85.3372 | 30.1547 | 1.517 | 64.2 |
| L2 | S3 | 65.2118 | 22.0400 |  |  |
|  | S4 | −224.3289 | 9.2623 |  |  |
| L3 | S5 | 86.1556 | 5.0000 | 1.492 | 57.1 |
|  | S6 | 71.1106 | 3.9830 | 1.517 | 64.2 |
| L4 | S7 | 294.6162 | 10.7200 |  |  |
|  | S8 | −95.8488 | 33.6999 |  |  |
| L5 | S9 | −42.5926 | 4.1000 | 1.492 | 57.1 |
|  | S10 | −45.0000 | 10.0000 | 1.487 | 50.0 |
| Lc | S11 | PLANAR | 13.1000 | 1.551 |  |
|  | S12 | 350.0000 |  |  |  |

TABLE 1B

| ASPHERICAL SURFACES | K | A | B | C | D |
|---|---|---|---|---|---|
| S1 | −16.308094 | 3.01843E-06 | −3.20490E-09 | 1.25520E-12 | −1.69165E-16 |
| S2 | −0.535400 | 2.48453E-07 | −1.29507E-09 | 6.28889E-13 | −4.05568E-17 |
| S5 | −3.389982 | −1.3237SE-06 | −7.83403E-10 | −1.74017E-13 | 2.19074E-16 |
| S6 | −1.056369 | −9.05422E-07 | −7.33921E-10 | 3.27624E-13 | 1.88190E-17 |
| S9 | −0.137526 |  |  |  |  |
| S10 | −0.300000 |  |  |  |  |

TABLE 1C

| EFFECTIVE FOCUS LENGTH | = | 78.0160 |
|---|---|---|

TABLE 1C-continued

| F-NUMBER | = | 1.0004 |
|---|---|---|
| SEMI-FIELD ANGLE | = | 37.1709 |

TABLE 2A

| LENS | SURFACE | RADIUS | THICKNESS | $N_d$ | $V_d$ |
|---|---|---|---|---|---|
| L1 | S1 | 79.8528 | 5.1700 | 1.492 | 57.1 |
|  | S2 | 115.4313 | 15.2235 |  |  |
| L2 | S3 | 268.6895 | 12.5400 | 1.517 | 64.2 |
|  | S4 | −84.1134 | 0.2278 |  |  |
| L3 | S5 | 53.6743 | 4.4000 | 1.492 | 57.1 |
|  | S6 | 53.1820 | 9.7429 |  |  |
| L4 | S7 | 91.9917 | 12.2200 | 1.517 | 64.2 |
|  | S8 | −116.1214 | 27.8720 |  |  |
| L5 | S9 | −43.7656 | 3.3000 | 1.492 | 57.1 |
|  | S10 | −38.0000 | 10.0000 | 1.487 | 50.0 |
| Lc | S11 | Planar | 13.1000 | 1.551 |  |
|  | S12 | −350.0000 |  |  |  |

TABLE 2B

| ASPHERICAL SURFACES | K | A | B | C | D |
|---|---|---|---|---|---|
| S1 | −8.210380 | 1.59420E-07 | −4.17483E-09 | 1.31097E-12 | 6.48622E-17 |
| S2 | −2.816124 | 2.37888E-07 | −1.70578E-09 | 1.83921E-13 | 3.38065E-16 |
| S5 | 1.089050 | −2.20686E-06 | 1.28304E-09 | 8.05101E-13 | −9.55977E-17 |
| S6 | −5.422146 | 1.03310E-06 | 1.04980E-09 | 7.33517E-14 | 1.21302E-15 |
| S9 | 0.995996 | −1.54840E-05 | 3.69942E-08 | −5.21292E-11 | 3.06780E-14 |
| S10 | 0.100000 |  |  |  |  |

TABLE 2C

| EFFECTIVE FOCUS LENGTH | = | 65.9831 |
|---|---|---|
| F-NUMBER | = | 1.0055 |
| SEMI-FIELD ANGLE | = | 36.9354 |

TABLE 3A

| LENS | SURFACE | RADIUS | THICKNESS | $N_d$ | $V_d$ |
|---|---|---|---|---|---|
| L1 | S1 | 77.9439 | 6.1700 | 1.492 | 57.1 |
|  | S2 | 85.9769 | 28.6057 |  |  |
| L2 | S3 | 91.9486 | 20.0400 | 1.517 | 64.2 |
|  | S4 | −157.2398 | 2.4196 |  |  |
| L3 | S5 | 59.9102 | 5.4000 | 1.492 | 57.1 |
|  | S6 | 57.4164 | 8.7941 |  |  |
| L4 | S7 | −6284.4831 | 12.2200 | 1.517 | 64.2 |
|  | S8 | −80.2058 | 40.9399 |  |  |
| L5 | S9 | −62.8213 | 4.1000 | 1.492 | 57.1 |
|  | S10 | −50.0000 | 10.0000 | 1.487 | 50.0 |
| Lc | S11 | Planar | 13.1000 | 1.551 |  |
|  | S12 | −350.0000 |  |  |  |

TABLE 3B

| ASPHERICAL SURFACES | K | A | B | C | D |
|---|---|---|---|---|---|
| S1 | −14.410380 | 2.11304E-06 | −3.18374E-09 | 1.35516E-12 | −1.86997E-16 |
| S2 | −3.581048 | 1.00733E-07 | −1.34217E-09 | 6.90624E-13 | −4.21295E-17 |
| S5 | −0.472904 | −4.69588E-07 | −1.04153E-09 | −8.98128E-13 | 4.31881E-16 |
| S6 | −0.354117 | 5.07524E-08 | −1.07603E-09 | −1.09049E-12 | 5.70800E-16 |
| S9 | 1.161942 | −6.14540E-06 | 8.77725E-09 | −5.63430E-12 | 1.47918E-15 |

TABLE 3B-continued

| ASPHERICAL SURFACES | K | A | B | C | D |
|---|---|---|---|---|---|
| S10 | −0.300000 | | | | |

TABLE 3C

| | | |
|---|---|---|
| EFFECTIVE FOCUS LENGTH | = | 80.6098 |
| F-NUMBER | = | 0.9919 |
| SEMI-FIELD ANGLE | = | 37.8302 |

TABLE 4A

| LENS | SURFACE | RADIUS | THICKNESS | $N_d$ | $V_d$ |
|---|---|---|---|---|---|
| L1 | S1 | 75.6702 | 5.1700 | 1.492 | 57.1 |
| | S2 | 85.1557 | 16.5060 | | |
| L2 | S3 | −587.5936 | 6.1700 | 1.492 | 57.1 |
| | S4 | −296.0681 | 0.1000 | | |
| L3 | S5 | 69.1831 | 22.0400 | 1.517 | 64.2 |
| | S6 | −165.8506 | 12.5647 | | |
| L4 | S7 | 85.8328 | 4.0000 | 1.492 | 57.1 |
| | S8 | 67.7547 | 4.4780 | | |
| L5 | S9 | 730.7782 | 11.7200 | 1.517 | 64.2 |
| | S10 | −91.4903 | 26.6999 | | |
| L6 | S11 | −35.8282 | 4.1000 | 1.492 | 57.1 |
| | S12 | −43.0000 | 10.0000 | 1.423 | 50.0 |
| Lc | S13 | Planar | 13.1000 | 1.551 | |
| | S14 | −350.0000 | | | |

TABLE 4B

| ASPHERICAL SURFACES | K | A | B | C | D |
|---|---|---|---|---|---|
| S1 | −11.9779-21 | 1.05381E-06 | −2.94018E-09 | 1.24525E-12 | −1.75007E-16 |
| S2 | −5.861024 | 1.86947E-07 | −8.94310E-10 | 6.59977E-13 | −1.34961E-16 |
| S3 | 12.982876 | 9.33040E-07 | 5.17732E-10 | 5.81935E-14 | −1.13694E-16 |
| S4 | −9.763245 | 1.19932E-07 | 1.77207E-10 | 1.32072E-13 | −7.52111E-17 |
| S7 | −3.887679 | −3.47931E-06 | −9.10467E-10 | 1.18679E-12 | −2.28174E-16 |
| S8 | −2.882595 | −2.33934E-06 | −5.71079E-10 | 1.18500E-12 | −1.69237E-16 |
| S11 | −0.460713 | | | | |
| S12 | −0.150000 | | | | |

TABLE 4C

| | | |
|---|---|---|
| EFFECTIVE FOCUS LENGTH | = | 78.02777 |
| F-NUMBER | = | 1.0120 |
| SEMI-FIELD ANGLE | = | 37.3577 |

TABLE 5A

| LENS | SURFACE | RADIUS | THICKNESS | $N_d$ | $V_d$ |
|---|---|---|---|---|---|
| L1 | S1 | 76.5590 | 6.1700 | 1.492 | 57.1 |
| | S2 | 92.3932 | 32.3088 | | |
| L2 | S3 | 58.1668 | 22.0400 | 1.517 | 64.2 |
| | S4 | −417.6887 | 12.3086 | | |
| L3 | S5 | 78.0722 | 5.0000 | 1.492 | 57.1 |
| | S6 | 58.1797 | 2.3301 | | |
| L4 | S7 | 138.5656 | 11.7200 | 1.517 | 64.2 |
| | S7 | −120.8416 | 29.6999 | | |
| L5 | S9 | −37.8040 | 4.1000 | 1.492 | 57.1 |
| | S10 | −42.0000 | 10.0000 | 1.423 | 50.0 |
| Lc | S11 | Planar | 13.1000 | 1.551 | |
| | S12 | −350.0000 | | | |

TABLE 5B

| ASPHERICAL SURFACES | K | A | B | C | D |
|---|---|---|---|---|---|
| S1 | −15.7944-51 | 2.78214E-06 | −3.19224E-09 | 1.15440E-12 | −1.34906E-16 |
| S2 | −1.695196 | 7.42204E-08 | −1.42040E-09 | 6.05643E-13 | −4.48757E-17 |
| S5 | −5.527069 | −2.64272E-06 | −9.28144E-10 | 3.74458E-13 | 9.58752E-17 |
| S6 | −3.554576 | −1.50632E-06 | −2.45315E-10 | 1.43843E-14 | 3.13859E-16 |
| S9 | −0.194997 | | | | |
| S10 | −0.200000 | | | | |

TABLE 5C

| | | |
|---|---|---|
| EFFECTIVE FOCUS LENGTH | = | 78.0412 |
| F-NUMBER | = | 1.0025 |
| SEMI-FIELD ANGLE | = | 37.1525 |

TABLE 6A

| LENS | SURFACE | RADIUS | THICKNESS | $N_d$ | $V_d$ |
|---|---|---|---|---|---|
| L1 | S1 | 66.5495 | 6.1700 | 1.492 | 57.1 |
| | S2 | 59.8955 | 30.1547 | | |
| L2 | S3 | 76.4198 | | 1.639 | 55.5 |
| | S4 | −180.1706 | 9.2623 | | |
| L3 | S5 | 608.63613 | 5.0000 | 1.492 | 57.1 |
| | S6 | 161.0015 | 8.2206 | | |
| L4 | S7 | 349.5400 | 12.7200 | 1.517 | 64.2 |
| | S8 | −77.1284 | 33.6999 | | |
| L5 | S9 | −43.9125 | 4.1000 | 1.492 | 57.1 |
| | S10 | −45.0000 | 10.0000 | 1.457 | 50.0 |
| Lc | S11 | Planar | 13.1000 | 1.551 | |
| | S12 | −350.0000 | | | |

TABLE 6B

| ASPHERICAL SURFACES | K | A | B | C | D |
|---|---|---|---|---|---|
| S1 | −9.480987 | 3.01263E-06 | −3.06282E-09 | 1.07999E-12 | −1.39720E-16 |
| S2 | −0.481219 | 5.41767E-07 | −1.68490E-09 | 7.23794E-13 | −7.53816E-17 |

TABLE 6B-continued

| ASPHERICAL SURFACES | K | A | B | C | D |
|---|---|---|---|---|---|
| S5 | −43.0707-67 | −1.25645E-06 | −4.05098E-10 | −4.03393E-14 | 5.99898E-17 |
| S6 | −.2.606426 | −3.30467E-07 | −3.73180E-10 | −1.99504E-13 | −2.45937E-17 |
| S9 | −0.006462 | | | | |
| S10 | −0.300000 | | | | |

TABLE 6C

| EFFECTIVE FOCUS LENGTH | = | 77.3694 |
|---|---|---|
| F-NUMBER | = | 0.9976 |
| SEMI-FIELD ANGLE | = | 37.2873 |

What is claimed is:

1. A projection lens system, for use in a rear type projection television, including a plurality of lenses which are sequentially arranged along an optical axis perpendicular to a CRT screen, said projection lens system comprising:
   a first lens unit comprising at least one lens having a meniscus form and a weak positive or weak negative optical power;
   a second lens unit comprising one lens with a strong positive optical power and a bi-convex form;
   a third lens unit comprising at least one lens having a weak positive or negative optical power and comprising a further lens having a strong positive optical power; and
   a fourth lens unit having a strong negative optical power, said fourth lens unit comprising a lens of meniscus form and of a convex shape on at least a surface directed toward the CRT screen and further comprising a coolant for cooling a fluorescent surface of the CRT screen.

2. The projection lens system as claimed in claim 1, wherein said first lens unit comprises one lens, said lens having at least one aspherical surface.

3. The projection lens system as claimed in claim 2, wherein said one lens of said first lens unit exhibits a positive optical power in its optical axis region, and a negative optical power in its periphery.

4. The projection lens system as claimed in claim 2, wherein said one lens of said first lens unit exhibits a negative optical power over its entire area.

5. The projection lens system as claimed in claim 1, wherein said first lens unit comprises at least two lenses, at least one surface of at least one of said two lenses being aspherical.

6. The projection lens system as claimed in claim 1, wherein said one lens in said second lens unit has two spherical surfaces.

7. The projection lens system as claimed in claim 1, wherein most of the overall optical power of said projection lens system is divided substantially between said second and third lens units.

8. The projection lens system as claimed in claim 7, wherein an optical power ratio of said third lens unit to said second lens unit is greater than 0.45 and less that 1.35.

9. The projection lens system as claimed in claim 1, wherein said third lens unit comprises a lens having a weak positive optical power; and
   a further lens having a strong positive optical power.

10. The projection lens system as claimed in claim 9, wherein said further lens of said third lens unit has a surface directed toward the CRT screen that is convex.

11. The projection lens system as claimed in claim 9, wherein said further lens of said third lens unit is bi-convex.

12. The projection lens system as claimed in claim 9, wherein one surface of said lens having a weak positive optical power in said third lens unit is aspherical, and both surfaces of said further lens in said third lens unit are spherical.

13. The projection lens system as claimed in claim 9, wherein an optical power ratio of said further lens in said third lens unit to said second lens unit is greater than 0.55 and less than 1.35.

14. The projection lens system as claimed in claim 9, wherein a dispersion value of said further lens of said third lens unit has an Abbe number less than 50.0.

15. The projection lens system as claimed in claim 9, wherein said lens having a weak positive optical power of said third lens unit is disposed between said further lens of said third lens unit and said one lens of said second lens unit.

16. The projection lens system as claimed in claim 9, wherein an absolute value of the optical power ratio of said lens having a weak positive optical power in said third lens unit to the optical power of the projection lens system overall is less than 0.18.

17. The projection lens system as claimed in claim 1, wherein a distance between said further lens in said third lens unit and said lens of meniscus form in said fourth lens unit is adjustable.

18. The projection lens system as claimed in claim 1, wherein said lens with a strong positive optical power in said second lens unit and said further lens in said third lens unit are glass lenses.

19. The projection lens system as claimed in claim 1, wherein a refractive index of said lens of meniscus form in said fourth lens unit is substantially equal to a refractive index of said coolant.

20. The projection lens system as claimed in claim 1, wherein said third lens unit comprises at least one lens having a weak positive or weak negative optical power, said lens having one aspherical surface of a convex shape, said surface being directed toward the CRT screen.

* * * * *